US010706739B2

(12) United States Patent
Marzetti et al.

(10) Patent No.: US 10,706,739 B2
(45) Date of Patent: Jul. 7, 2020

(54) SYSTEMS AND METHODS FOR TRAINING PEOPLE TO A MODIFIED GAIT OR POSTURE (71) Applicant: ARIZONA BOARD OF REGENTS ON BEHALF OF ARIZONA STATE UNIVERSITY, Scottsdale, AZ (US)

(72) Inventors: Sandro Marzetti, Monteprandone (IT); Caterina Germani, San Benedetto del Tronto (IT); Marco Santello, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 541 days.

(21) Appl. No.: 14/939,695

(22) Filed: Nov. 12, 2015

(65) Prior Publication Data
US 2016/0140865 A1    May 19, 2016

Related U.S. Application Data (60) Provisional application No. 62/080,027, filed on Nov. 14, 2014.

(51) Int. Cl.
*G09B 19/00* (2006.01)
*A63B 69/00* (2006.01)
(Continued)

(52) U.S. Cl.
CPC ........ *G09B 19/003* (2013.01); *A63B 69/0002* (2013.01); *A63K 3/046* (2013.01);
(Continued)

(58) Field of Classification Search
CPC ...... A63B 2069/0008; A63B 2225/093; A63B 69/0002; A63B 69/3641; A61H 1/0262; A63K 3/043; A63K 3/046; G09B 19/003
See application file for complete search history.

(56) References Cited

U.S. PATENT DOCUMENTS 3,451,677 A * 6/1969 Nedwick .............. A63B 69/345
473/440
3,747,233 A * 7/1973 Berryman .......... A63B 23/0464
434/255

(Continued)

FOREIGN PATENT DOCUMENTS

CA       2062181         9/1993
GB       2291361 A  *  1/1996    ............ A63B 22/02
WO    WO 2001/37941     5/2001

OTHER PUBLICATIONS

Search report issued in Italian patent application BO2013A 000503, dated Jun. 11, 2014.

*Primary Examiner* — Jack Yip
(74) *Attorney, Agent, or Firm* — Faegre Drinker Biddle & Reath LLP (57) ABSTRACT Device for training people to a preferred posture during normal gait comprising of: at least a base for stabilizing at least one rail or post coupled to said base at least one gait regulating component, which will be arranged perpendicularly with respect to said rod or post and parallel to the floor surface, with said gait regulating component provided for defining an obstacle during the normal gait of a user to impose on the latter a predetermined movement of the foot, knee, and hip, facilitating the maintenance of the user's bust erected in a position of equilibrium, with the consequent lengthening of the pushing leg, the gradual transition of the weight of the user's body by the supporting foot posterior to that of the advancing leg, and the oscillation of the arm forward opposite to the lower limb that moves, with a final effect of a steady pace.

15 Claims, 4 Drawing Sheets (51) Int. Cl.
*A63K 3/04* (2006.01)
*A63B 69/36* (2006.01)
*A61H 1/02* (2006.01)

(52) U.S. Cl.
CPC ........ *A61H 1/0262* (2013.01); *A63B 69/3641* (2013.01); *A63B 2069/0008* (2013.01); *A63B 2225/093* (2013.01); *A63K 3/043* (2013.01)

(56) References Cited

U.S. PATENT DOCUMENTS

| | | | | |
|---|---|---|---|---|
| 3,999,755 A * | 12/1976 | Shealy, Jr. | ............ | A63B 69/345 473/440 |
| 4,538,808 A * | 9/1985 | Holland | ............. | A63B 69/0071 473/447 |
| 4,743,009 A | 5/1988 | Beale | ............................... | 482/54 |
| 5,024,601 A * | 6/1991 | Barker | ............... | A63B 69/0022 434/255 |
| 5,171,196 A * | 12/1992 | Lynch | .................. | A63B 21/154 482/54 |
| 5,176,597 A * | 1/1993 | Bryne | .................... | A61H 3/008 482/54 |
| 5,429,563 A | 7/1995 | Engel et al. | ..................... | 582/54 |
| 5,888,152 A * | 3/1999 | Rogers | ................. | A63B 69/345 473/440 |
| 6,135,921 A * | 10/2000 | Holland | .................... | A63B 5/16 482/14 |
| 6,168,548 B1 * | 1/2001 | Fleming | .................. | A63B 3/00 482/23 |
| 2002/0005512 A1 | 1/2002 | Trill | ................ | 256/25 |
| 2004/0087418 A1 | 5/2004 | Eldridge | ......................... | 482/54 |
| 2005/0101448 A1 | 5/2005 | He et al. | .......................... | 482/54 |
| 2006/0194680 A1 * | 8/2006 | Croft | ...................... | A63B 1/00 482/123 |
| 2006/0229167 A1 | 10/2006 | Kram et al. | ..................... | 482/54 |
| 2010/0078613 A1 | 4/2010 | Payne | ............................. | 256/24 |
| 2010/0113227 A1 * | 5/2010 | Habing | ................. | A63B 21/023 482/51 |
| 2016/0166460 A1 * | 6/2016 | Murphy | ............ | A63B 69/0064 601/34 |

\* cited by examiner

SYSTEMS AND METHODS FOR TRAINING PEOPLE TO A MODIFIED GAIT OR POSTURE

CROSS REFERENCE TO RELATED APPLICATIONS

This application claims priority to U.S. Provisional Application No. 62/080,027 filed Nov. 14, 2014, which is incorporated by reference in its entirety.

BACKGROUND OF THE INVENTION

A. Field of the Invention

The invention generally concerns devices and methods to train people to a preferred posture during walking.

B. Background

The analysis of different persons' gaits reveals a variety of gaits, some of which are due to incorrect postures. The incorrect postures can lead to erroneous small movements during one's gait. If neglected, sometimes these small movements cause permanent damage to the spine and serious alterations to our normal perception of balance. Thus, it is important to pay attention to the way one walks.

To maintain proper body position during movement, one has to follow just a few rules that, if neglected, besides causing damage, create swaying and/or jolting gait. It is necessary to try to stay as upright as possible when walking and correct oneself when one assumes an incorrect posture.

A device to train people to a preferred posture during normal gait can be beneficial.

SUMMARY OF THE INVENTION

The present application offers a solution to the current problems associated with incorrect postures and abnormal gaits. Described embodiments use one or more gait regulating components to train a person to maintain and memorize a preferred posture during one's gait. Some embodiments can define a path for training and others for using in combination with a treadmill.

Embodiments of a gait regulating component can include a base configured to mount to a supporting structure that is disposed in fixed relation to a floor or a treadmill conveyor; and a rod extending between a first end and a second end, the first end of the rod configured to couple to the base; where the rod includes a bendable portion such that the second end of the rod is movable relative to the base; and where each of the two or more gait regulating components is configured such that the rod is substantially parallel the floor when the base is mounted to the supporting structure.

Embodiments of a training system can include a rail or post and one or more gait regulating components comprising a base configured to mount to the rail or post and a rod coupled to the base. The rail can be supported by one or more rail supports so that the rail is disposed above but spaced apart from but substantially parallel with the walking surface. The post can be supported by a base so that it extends upright relative to the walking surface.

Embodiments can include methods of improving a posture or a gait of a user by using the systems described herein. A method can comprise walking and encountering with each step a gait regulating component, where the gait regulating component comprises a bar that extends in a direction substantially parallel to the floor.

Some embodiments can comprise modular components that can be assembled to define straight, curved, or angled paths. The modular components can also facilitate compact storage of the device.

Some embodiments can be adjusted based upon the size (height or width) of the user or the length of a step for the user.

Some embodiments are methods of using the device for physical rehabilitation. Some embodiments are methods of using the device for posture and/or gait improvement.

The term "coupled" is defined as connected, although not necessarily directly, and not necessarily mechanically.

The terms "a" and "an" are defined as one or more unless this disclosure explicitly requires otherwise.

The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, the methods and systems of the present invention that "comprises," "has," "includes" or "contains" one or more elements possesses those one or more elements, but is not limited to possessing only those one or more elements. Likewise, an element of a method or system of the present invention that "comprises," "has," "includes" or "contains" one or more features possesses those one or more features, but is not limited to possessing only those one or more features.

Furthermore, a structure that is capable performing a function or that is configured in a certain way is capable or configured in at least that way, but may also be capable or configured in ways that are not listed. Metric units may be derived from the English units provided by applying a conversion and rounding to the nearest millimeter.

The feature or features of one embodiment may be applied to other embodiments, even though not described or illustrated, unless expressly prohibited by this disclosure or the nature of the embodiments.

Any method or system of the present invention can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The characteristics of the invention will be pointed out in the following description of a preferred, but not exclusive, implementation, with reference to the accompanying drawings, in which.

DETAILED DESCRIPTION OF THE INVENTION

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Embodiments of the present disclosure comprise a system used in training a person to modify their posture or gait. The system can comprise one or more gait regulating components. Each gait regulating component includes a base configured to mount to a supporting structure that is disposed in fixed relation to a floor or a treadmill conveyor; and a rod extending between a first end and a second end, the first end of the rod configured to couple to the base; where the rod includes a bendable portion such that the second end of the rod is movable relative to the base; and where each of the two or more gait regulating components is configured such that the rod is substantially parallel the floor when the base is mounted to the supporting structure. In some embodiments, substantially parallel can mean being within 20 degrees in any direction of a line that extends parallel to the walking surface. In some embodiments, substantially parallel can mean being within 10 degrees in any direction of a line that extends parallel to the walking surface.

In some embodiments, the supporting structure is a wall (the gait component mounted thereto), a rail configured to couple to the base of the gait regulating component and extend substantially parallel to the floor, or a post configured to couple to the base of the gait regulating component and extend upright relative to the floor.

In embodiments comprising a rail, the rail can be supported by at least one rail support configured to extend upright relative to the floor and to support the rail such that it is spaced apart from the floor. The rail support comprises a head portion opposite a base portion, where the head portion is configured to couple to one or more rails. In some embodiments, each rail support comprises a ballasting member disposed in the base portion and configured to stabilize the rail support while the rail support is in an upright position relative to the floor.

In some embodiments, the head portion of the rail support is configured to couple to two rails. For example, the head portion can be configured to couple to a first rail and a second rail such that the first rail extends along a first portion of a training path and the second rail extends along a second portion of the training path.

Figure 2B:
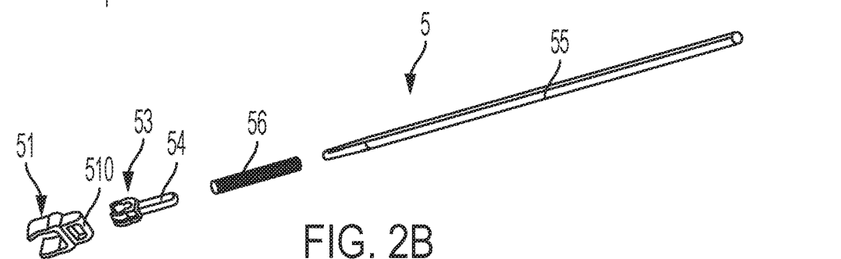
FIG. 2B illustrates an enlarged exploded perspective of the detail B of FIG. 1.
Figure 3:
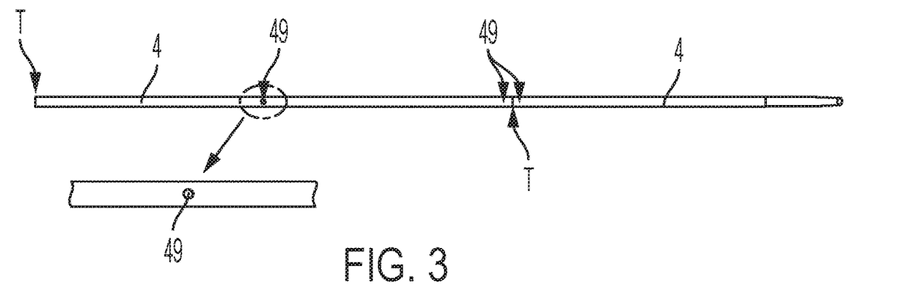
FIG. 3 illustrates a bottom view of the bars that are part of the system.

In some embodiments, the system is configured to be easily collapsed to occupy a smaller dimension for ease of transport and/or storage. This collapsibility is facilitated by a plurality of hinges. In some embodiments, the head portion comprises a hinge configured such that the first rail is moveable relative to the second rail (see e.g., hinge 33 of FIG. 5). This hinge can be configured such that the first rail can be substantially parallel with the second rail. In some embodiments, the head portion comprises another hinge configured such that the rail is moveable relative to the base portion (see e.g., pin 23 of FIG. 4 and pin-receiving hole 13 form a hinge). This hinge can be configured such that the rail can be substantially parallel with the base portion. In some embodiments, the gait regulating component comprises a hinge configured such that the second end of the bar is movable relative to at least a portion of the base (e.g., components 510 and 53 of FIG. 2B form a hinge). This hinge can be configured such that the second end of the bar can be substantially parallel with the supporting structure. (In some embodiments, substantially parallel can mean being within 20 degrees in any direction of a line that extends parallel to the referenced component. In some embodiments, substantially parallel can mean being within 10 degrees in any direction of a line that extends parallel to the referenced component.)

In some embodiments, the base of each gait regulating component is releasably coupled to the supporting structure.

In some embodiments, the gait regulating component is bendable so that a force applied by the user does not deform the rod. For example, the rod can comprise a flexible portion or a hinge so that the second end of the rod is moveable relative to at least a portion of the base.

For example, with reference to the attached drawings and particularly FIGS. 1-8, system 9 comprising a rail and configured for training people to a preferred posture during the normal gait is shown. The system 9 is defined by at least one branch 90 comprising: at least rail support 1, configured to be placed on a walkable floor; at least one rail 4, for example defined by a section, whose heads are occluded by the corresponding finishing plugs T, comprising a series of equally spaced openings 49, along its extension (FIG. 3), with said rail 4 configured to couple to the rail support 1; and gait regulating components 5 couple to said rail 4 such that they each extend substantially parallel to and above the walking surface, e.g., the floor. The distance above the walking surface can be 5 cm, 6 cm, 7 cm, 8 cm, 9 cm, 10 cm, 11 cm, 12 cm, 13 cm, 14 cm, 15 cm, 16 cm, 17 cm, 18 cm, 19 cm 20 cm, 21 cm, 22 cm, 23 cm, 24 cm, or 25 cm. The distance above the walking surface will vary depending on the leg length of the user.

Figures 1, 2A:
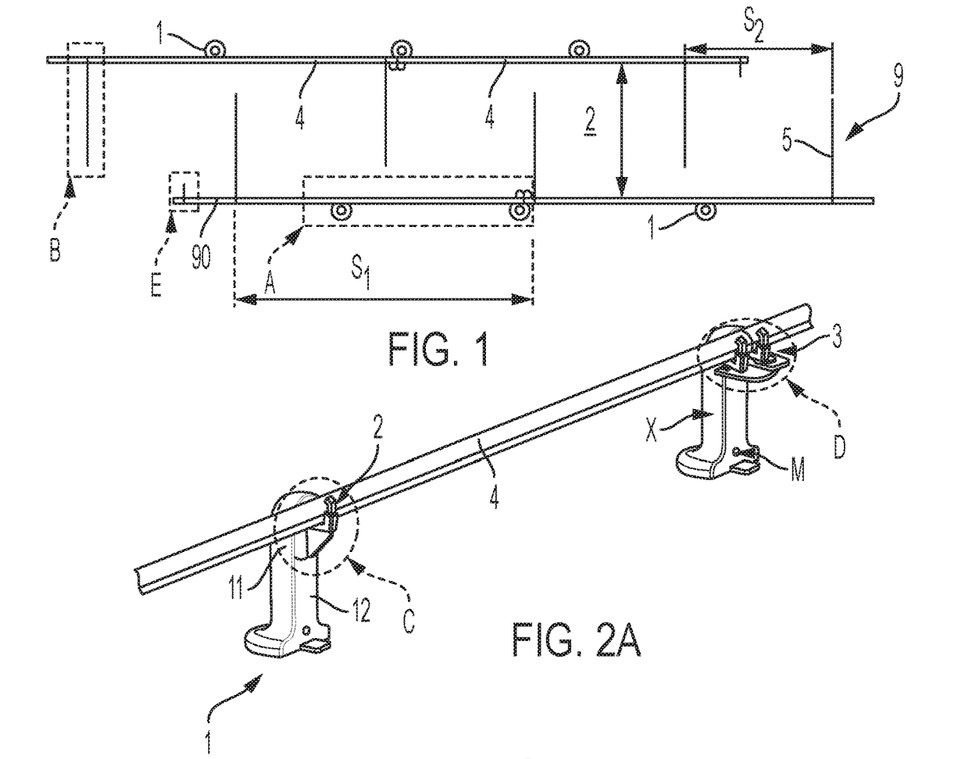
FIG. 1 illustrates the top view of a first implementation of a device for training people to a preferred posture during the normal gait.
FIG. 2A illustrates an enlarged view in perspective of the detail A of FIG. 1.
Figure 6:
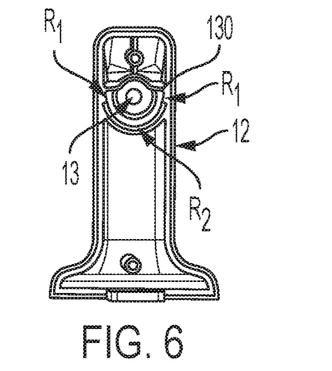
FIG. 6 illustrates a front view of the element indicated with X in FIG. 2A.
Figure 7:
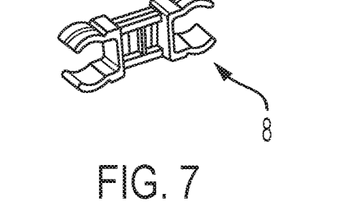
FIG. 7 illustrates an enlarged perspective view of detail E of FIG. 1.
Figure 8:
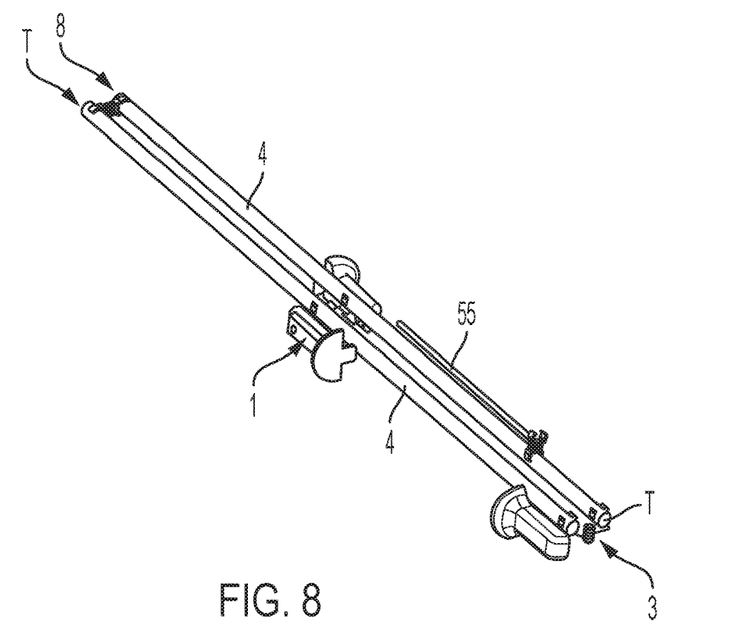
FIG. 8 illustrates a perspective view of a branch of the system according to FIG. 1 disposed in the inoperative position of non-use.

In an example of implementation, illustrated in FIGS. 2A, 6, 8, each rail support 1 comprises a head portion 11 coupled to a base portion 12, inside which is positioned a sinker (not shown); said rail support 1 is stabilized by a ballasting member M.

The base portion 12 has a slot, not shown, the opening of which fits over the edge of the wall 130 which delimits a pin-receiving hole 13 (FIG. 6); said wall 130 has two opposite first seats R1, which are adjacent to the sides of the body of the head portion 11, and a second seat R2 provided on the lower part of said wall 130, whose plane of symmetry is perpendicular to the plane of symmetry of the first seats R1.

Head portion 11 comprises a support element 2 that is configured to couple to the rail support 1 (FIG. 2A) via one of the openings 49 provided along a rail 4, or, in case you need to join and support two rails 4 in succession, a two rail support element 3 comprising a hinge 33 couple to two rails via one of said openings 49 provided at the end of a rail 4 and via one of said openings 49 provided at the end of an additional rail 4.

Figure 4:
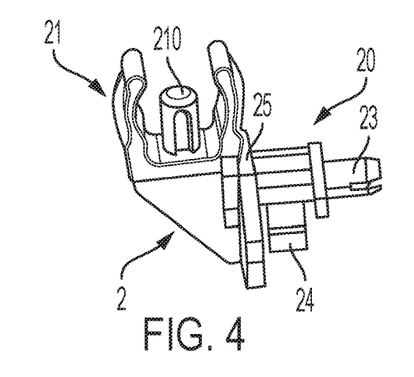
FIG. 4 illustrates an enlarged view according to a different perspective of part of the detail C of FIG. 2A.

The support element 2, an example of which is shown in FIG. 4 in a non-exclusive form of implementation, is defined by an anchoring tool 20, configured to couple it with base portion 12, and by a first coupling tool 21, which is U-shaped and with a pin 210, on a continuum with the anchoring tool 20 so that said first coupling tool 21 is aligned orthogonally to the edge of the anchoring tool 20; said first coupling tool 21 is designed to embrace and snap, in an elastic way, to the rail 4 in such a way that the first plug 210 is inserted into an opening 49 provided in said rail 4 to stabilize the anchoring of the latter to the support element 2.

The anchoring tool 20 is defined, (see example in FIG. 4), by a pin 23 that is configured to frictionally and rotatably engage pin-receiving hole 13 in the base portion 12. The anchoring tool 20 further comprises a catch 23 which extends transverse to the axis of the pin and is configured to frictionally engage one of the seats R1, R2. The anchoring tool 20 further comprises plate 25 to cover the pin-receiving hole 13. The pin 23 and pin-receiving hole 13 form a hinge such that the support element 2, 3 can rotate relative to the base portion.

Figure 5:
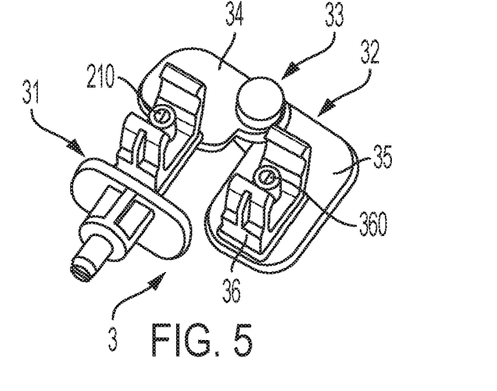
FIG. 5 illustrates an enlarged view according to a different perspective of part of the detail D of FIG. 2A.

The two rail support element 3, see example shown in FIG. 5, in a non-exclusive form of implementation, is defined by: a first part 31, equal to the conformation of the support element 2, and therefore the same numerical references are used, designed to couple to base portion 12 and to which can be coupled a rail 4; a second part 32, affected by a hinge 33 that conforms to a first portion 34 integral with the first part 31, and a second portion 35 supporting a second coupling U-shaped tool 36 that is centrally coupled by a second plug 360, with said second engagement tool 36 designed to embrace and snap elastically to an additional rail 4 in such a way that the second plug 360 is inserted into an opening 49 provided in said additional rail 4 to stabilize the coupling of the latter to the two rail support 3.

Each gait regulating component 5 (FIG. 2B) comprises a base (e.g., components 51, 53, 510, and 54 form the base) and a rod 55. The base is configured to mount the rod 55 to the rail 4. The base comprises a U-shaped slider 51 configured to couple via a snap joint to rail 4; a hinge comprising a hooking element 53 and berth bridge 510, and a prominence 54 disposed opposite hooking element 53. The hooking element 53 is configured to rotatably couple to the berth bridge 510. And the rod 55 is coupled to the base through a resilient connection 56 to the prominence 54.

The above-described system provides for the assembly of the parts that to define at least one branch 90 in which the rail supports 1 contact a floor surface on which one can walk, to support at least one rail 4 parallel to said floor area, with said rail 4 supporting the gait regulating components 5 placed at a distance S1 from each other, with this distance proportional to the magnitude of the step that a user needs or wants, when using the system 9.

In some embodiments, the system 9, as shown in FIG. 1, can be used to define a training path by spacing two branches 90 apart a distance "Z", which is not less than the length of the gait regulating component 5 such that these are arranged parallel to the floor surface to form a rectilinear path in which the gait regulating components 5 provided on each branch 90 are anchored to the corresponding rail 4 at a distance S2 which is equal to twice the distance S1, in such a way that, following the arrangement of the two branches to identify said path, the gait regulating components 5 face each other on opposite side in alternative fashion at a distance S1 from each other. In other embodiments, two branches are disposed end to end to define a training path, and the gait regulating component 5 on each branch 90 are spaced apart S1, e.g., the length of a desired step (also referred to as desired stride length).

Figure 9:
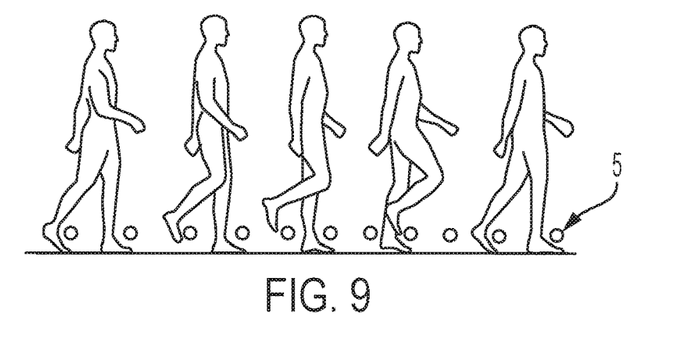
FIG. 9 illustrates a schematic view of gait implemented by a person with the use of the system according to FIG. 1.

The use of the system 9, as shown schematically in FIG. 9, requires the user to walk along the path identified by the branches 90; in one of the uses of the system, the user lying in front of each of the gait regulating components 5 must thread the "advancing" foot at the bottom of the gait regulating components 5, by forcing the user to a predetermined movement of the foot, knee, and hip, thus facilitating the maintenance of the upright in a position of equilibrium, namely the vertical line that passes through the center of gravity ('baricenter') falling within the base of support, with the consequent lengthening of the rear leg, the gradual shift of the body weight of the user from the support foot posterior to that of the advancing foot and the forward oscillation of the arm opposite to the moving lower limb.

Furthermore, the gait regulating component 5 that each foot meets during the walk forces default movements also of the rear leg. In fact, throughout the evolution of the step, once the user's body weight has fully loaded on the "advancing" foot tucked under the gait regulating component 5, the rear leg is retrieved and, once this encounters the gait regulating component 5, this causes the foot to go over the gait regulating component 5 with concurrent lifting of the knee, in such a way as to induce a predefined stride length.

Figure 10:
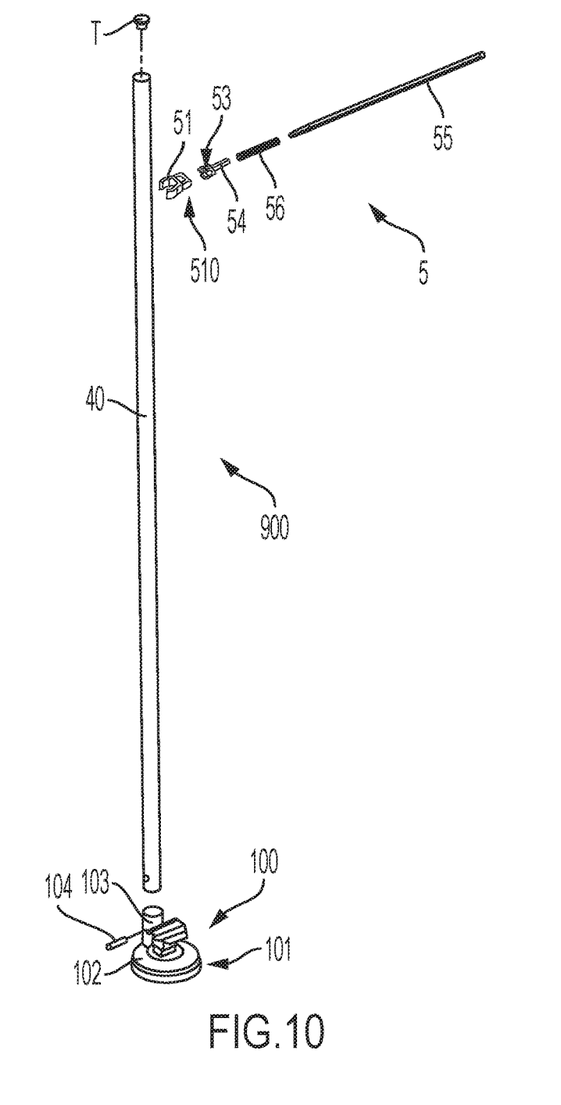
FIG. 10 illustrates an exploded view of a second implementation of the system to train people to a preferred gait.

In a second implementation illustrated in FIG. 10, the system 900 comprising a post 40 and configured to teach people to reach a preferred posture during a normal gait is shown. System 900 comprises a base 100 which is placed over the floor area, a post 40 configured to extend upright relative to the base, and a gait regulating component 5 as described for the first implementation of the device. The base 100 is configured to stabilize the upright post. In the embodiment shown, the base 100 comprises a body comprising a suction cup element 101 for stabilizing the base at one end, a sleeve 103 in which it engages and stabilizes a post 40 configured to extend upright relative to the walking surface, whose upper end is occluded by a finishing T-plug, and to which is coupled. A slideable pin 104 can extend through a hole in the base of the post 40 to releasably secure the post relative to the sleeve 103.

Figure 11:
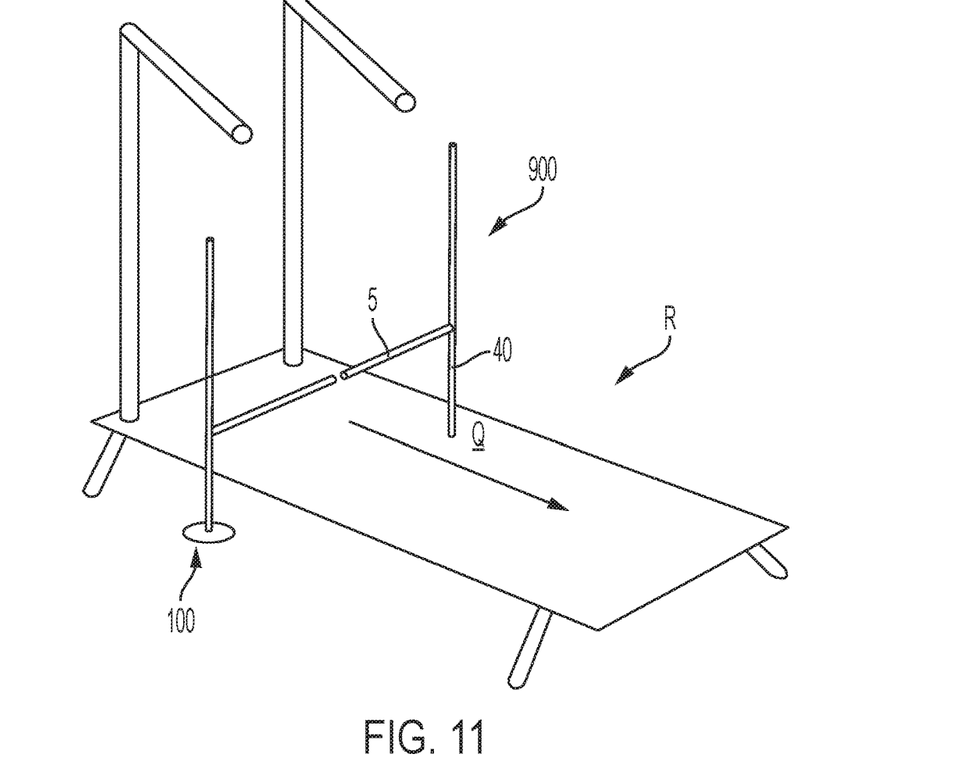
FIG. 11 illustrates a schematic view of the system according to FIG. 10.

The system 900 may be placed at the sides of a treadmill R, as shown in FIG. 11, with the gait regulating component 5 coupled to a post 40 which is supported by base 100. The post 40 is configured so that the gait regulating component 5 can be adjusted to be directly above the footboard/conveyor of the same treadmill R. The gait regulating component 5 serves as an obstacle to the user for training a predetermined posture. The distance above the treadmill footboard can be 5 cm, 6 cm, 7 cm, 8 cm, 9 cm, 10 cm, 11 cm, 12 cm, 13 cm, 14 cm, 15 cm, 16 cm, 17 cm, 18 cm, 19 cm 20 cm, 21 cm, 22 cm, 23 cm, 24 cm, or 25 cm. The distance above the walking surface will vary depending on the leg length of the user.

The treadmill allows the user to walk in place thanks to the fact that the footboard flows in the direction "Q" contrary to the motion of the user.

Figure 11A:
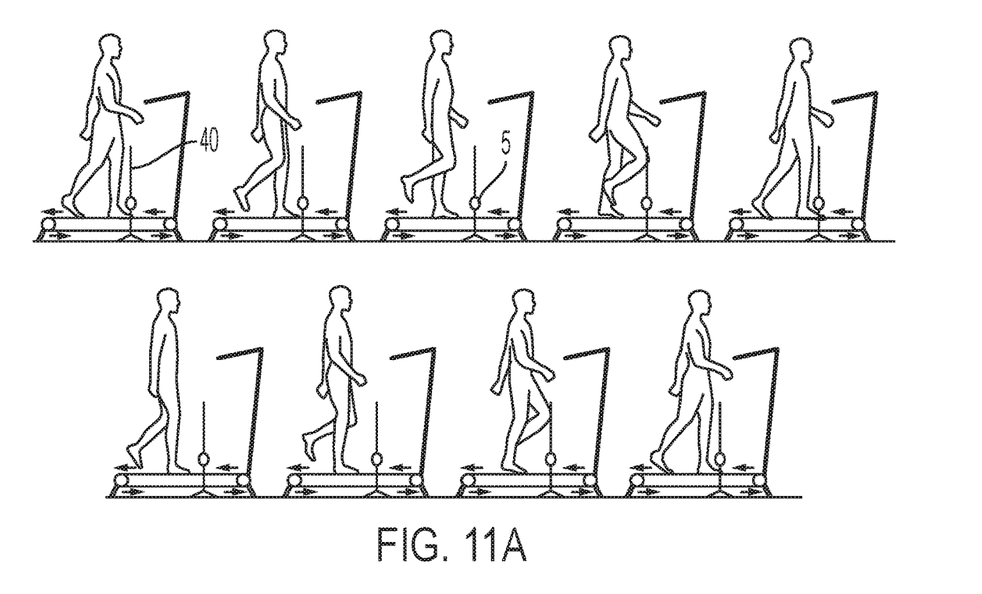
FIG. 11A illustrates a schematic gait that person adopts with the use of the system in FIG. 10.

The presence of the system on one or both sides of the treadmill induces a default movement of the user. In fact, in one of its uses, the user himself must thread the "advancing" foot below the corresponding gait regulating component 5 forcing the user, as described above, to keep his/her trunk upright in a position of equilibrium, ensuring that the vertical line that passes through the center of gravity (baricenter) falls within the base of support, with the consequent lengthening of the rear leg, the gradual shift of the body weight of the user from the support foot posterior to that of the advancing foot, the forward oscillation of the arm opposite to the moving lower limb, the consequent lifting of the foot and knee to allow the advancement of the rear leg to enable the positioning of the corresponding foot below the gait regulating component 5 (FIG. 11A).

It should be noted that the positioning of the system 900 with respect to the treadmill can be adjusted before the start of that activity according to the training needs of the user.

This positioning can result in the scaling of the gait regulating component 5 through a series of movements of the advancing foot and the rear leg as described above following the use of the system 9.

The system 9, 900, described in the first and second types of implementation, has characteristics that are particularly beneficial.

The availability of the gait regulating components 5, coupled to a rail 4 at a default location, or to a post 40 supported by a base 100 positioned next to a treadmill R, forces the user to perform predefined movements. In fact, the attention will be directed to place the foot under a gait regulating component 5, to maintain the attitude of the body of user in perfect balance (straight torso, elongated rear leg, so that the vertical line passing through the center of gravity falls within the base of support) immediately retrieving the rear leg that will now be constrained to move in a direction indicated by the next gait regulating component 5.

This implies, therefore, a relaxed neck posture, straight shoulders and horizontal alignment of the pelvis, so as to achieve an improved alignment between the imaginary axes passing through these points of the body.

Such movement avoids the sudden loading of the body weight on the heel, thus ensuring a gradual transition of the user's bodyweight from the supporting foot posterior to the advancing foot, and resulting in a nice, smooth, and regular gait without vertical oscillations, and preventing incorrect posture like hunched back or torso leaning forward.

The use of the system 9, 900, enables the retrieval and memorization of the gait, with the establishment of an upright posture and stability of the body core, the active and proper use of the back and abdomen muscles following the forced movement of the ankle, knee, and hip resulting from the position of the foot relative to the gait regulating component 5.

The particular configuration of the system 9 described in the first type of implementation has also several advantages with regard to the assembly, because the rail support 1 is shaped so as to be able to internally accommodate a ballasting member which facilitates stabilizing the rail support 1 when in an upright position relative to the support/walkable surface (e.g., floor).

The configuration of the parts of the system 9 allow the same to be easily assembled both to realize the branch 90 of the same system for removing or replacing a part of the same branch 90.

The system 9, in fact, for the parts described in the non-exclusive example described here, can be configured in an inoperative position of minimum overall dimensions (FIG. 8) wherein: each base portion 12 is oriented parallel to the corresponding rail 4; the second portion 35 of the connecting element and the two rail support 3 are rotated in such a way that the second coupling tool 36 is positioned alongside the first coupling tool 21 and, therefore, the further next rail 4 supported by the same is arranged to flank the previous rail 4; each slider 51 is appropriately oriented on the rail 4 to which it is anchored in such a way that the rod 55 of the gait regulating component 5 runs parallel to the rail 4: this position is maintained by a coupling 8 (FIG. 7) configured to elastically embrace each of the two adjacent bars and holds them in fixed relation to each other in the vicinity of the coupling 8.

The branch 90, once in the position of minimum overall dimensions, can be placed into a container and be easily transportable.

For example, by having a two rail support 3 as described above allows to provide a system with a variable length and/or that defines a non-rectilinear path; the second portion 35 of said two rail support 3, in fact, can undergo different orientations, thus defining an angled training path with angularly disposed branches 90.

The configuration of the gait regulating component 5 also presents several advantages because the slider 51 allows easy anchoring of the same gait regulating component 5 to the rail 4, and the possibility to adjust the position of the latter along the rail 4 according to the length of the step which the user wants to perform during use of the system 9.

In the first type of implementation, it is possible to vary the distance between a gait regulating component 5 and the other to adjust the length of the step, while in the second type of implementation it is possible to vary the height of the gait regulating component 5 along the post 40 to adjust the distance between the gait regulating component 5 and the carpet of the treadmill: a small distance between the gait regulating component 5 and the carpet implies greater control of the movement of the foot and body posture, which is possible by making a smaller step and vice versa.

The fact that the rod 55 is connected to the extension of the protrusion 54 of the second coupling element 53 through a resilient connection 56 is advantageous because, if bumped by the user, said rod 55 yields elastically to follow the direction of the gait of the user to return to its original position. In other embodiments, a hinge (not shown) may be used so that he rod 55 yields to follow the direction of the gait of the user. The hinged connection may further comprise a spring configured so that the rod 55 can return to the original position once the deflecting force is removed.

The system 900 of the second type of implementation can also be used without being combined with a treadmill, i.e., it is possible to put a predetermined number of post and gait regulating components alternating along a linear or curved path depending on the type of desired path.

It is noted that the system 9, 900 can be used both to store a series of movements of the parts of the body to a default posture during gait, both in terms of activity of post-traumatic and/or post-operative recovery, to restore the dynamic equilibrium of gait with significant increase and control of muscle tone and posture, as well as for the implementation of special training programs of "elegant" gait that involves the use of high-heeled shoes.

It is noted that the base portion 12 or base 100, can be implemented in various ways that do not affect the functional efficiency of the system 9, 900, but such as to ensure the stability of the system.

The structure of the systems 9, 900 can include special support elements and connective elements that enable easy assembly and storage of the systems.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present training systems and method is not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase (s) "means for" or "step for," respectively.

The invention claimed is:

1. A system used in training a person to modify his or her posture or gait, the system comprising:
   two or more gait regulating components, each comprising:
      a base configured to mount to a first rail, the base disposed in fixed relation to a floor;
      the base comprising a rail support, the first rail support configured to extend upright relative to the floor and to support the first rail such that the first rail is spaced apart from the floor,
         wherein the rail support comprises a head portion configured to couple to the first rail, the head portion configured to couple to the first rail and a second rail such that the first rail extends along a first portion of a training path and the second rail extends along a second portion of the training path, where the head portion also comprises a hinge configured such that the first rail is moveable relative to the second rail; and
      a rod having a first end and a second end, the first end of the rod configured to couple to the base,
         where the rod includes a bendable portion, the bendable portion positioned and bendable such that the second end of the rod is movable relative to the base, and,
      where each of the two or more gait regulating components is configured such that their rod is substantially parallel to the floor; and
   a treadmill positioned below the rods, the treadmill having a moveable first belt, wherein the first belt is moveable such that an outer surface of the belt, during a repeating movement cycle of the belt, moves from before the rods, to underneath the rods, to beyond the rods for each repeating movement cycle.

2. The system of claim 1, where each rail support comprises a ballasting member disposed in the base and configured to stabilize the rail support while the rail support is in an upright position relative to the floor.

3. The system of claim 1, where the hinge is configured such that the first rail can be substantially parallel with the second rail.

4. The system of claim 1, where a gait regulating component comprises a hinge configured such that the second end of the rod is movable relative to at least a portion of the base.

5. The system of claim 4, where the hinge of the gait regulating component is configured such that the second end of the rod can be substantially parallel with the supporting structure.

6. The system of claim 1, where each of the gait regulating components is positioned above the treadmill a distance D, the distance D serving to allow a user of the treadmill to advance a front portion of the user's foot below each of the gait regulating components as the user walks on the treadmill.

7. The system of claim 1, where the bendable portion of the gait regulating component is disposed at the first end of the rod.

8. The system of claim 1, where the bendable portion comprises an elastomeric material or a hinge.

9. The system of claim 1, where each of the gait regulating components is adjustable to be positioned above the treadmill a distance D, the distance D in the range of 15 cm to 20 cm above a walking surface of the treadmill.

10. The system of claim 1, where the supporting structure comprises a base portion and a post configured to couple to the base portion such that the post extends upright relative to the floor, where the base portion is configured to stabilize the upright support and the gait regulating component is configured to mount to the post.

11. The system of claim 1 where each of the gait regulating components is positioned above the treadmill a distance D, the distance D serving to regulate the loading of a user's body weight on the user's heel while walking on the treadmill, the distance D in the range of 5 cm to 15 cm above a walking surface of the treadmill.

12. The system of claim 1 where each of the gait regulating components is adjustable to be positioned above the above the treadmill a distance D, the distance D in the range of 5 cm to 10 cm above a walking surface of the treadmill.

13. The system of claim 1, where each of the gait regulating components is positioned above the treadmill a distance D, the distance D serving to allow a user of the treadmill to thread an advancing foot of the below each of the gait regulating components and above a moving walking surface of the treadmill, as the user walks on the treadmill.

14. A system used in training a person to modify his or her posture or gait, the system comprising:
- two or more gait regulating components, each comprising:
  - a base configured to mount to a rail that is disposed in fixed relation to a floor, the base comprising a head portion, the head portion comprising a hinge configured such that the rail is moveable relative to the base; and
  - a rod having a first end and a second end, the first end of the rod configured to couple to the base,
    - where the rod includes a bendable portion, the bendable portion positioned and bendable such that the second end of the rod is movable relative to the base, and
  - where each of the two or more gait regulating components is configured such that their rods are substantially parallel to the floor when the base is mounted to the rail; and
- a treadmill positioned below the rods, the treadmill having a moveable first belt, wherein the first belt is moveable such that an outer surface of the belt, during a repeating movement cycle of the belt, moves from before the rods, to underneath the rods, to beyond the rods for each repeating movement cycle.

15. The system of claim 14, where the hinge of the head portion is configured such that the rail can be substantially parallel with the base.

* * * * *